Jan. 11, 1944. M. S. GREENWALD 2,339,010
COMBINED LIGHT FIXTURE AND STERILE LAMP
Filed June 17, 1942
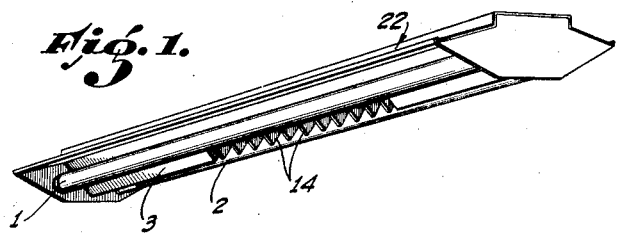
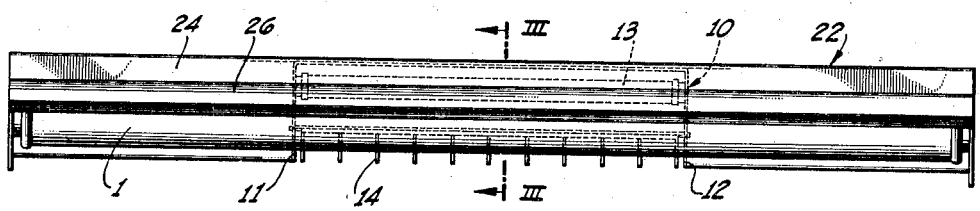
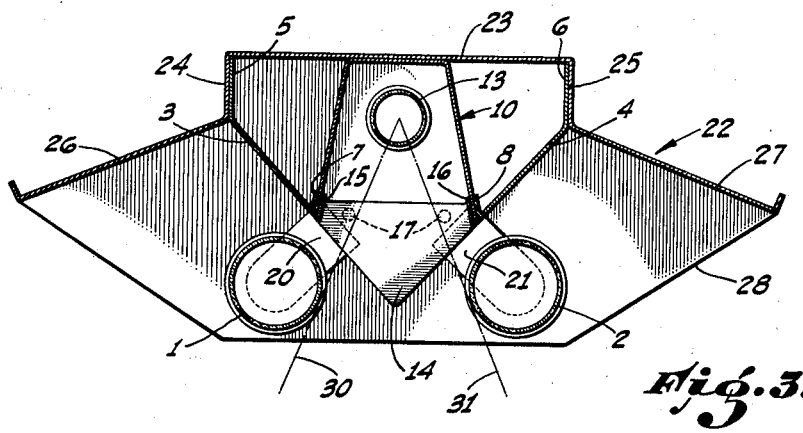
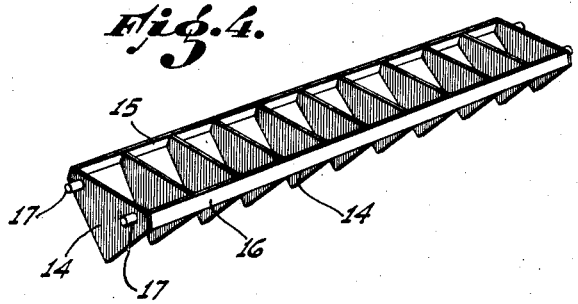
MILTON S. GREENWALD,
INVENTOR.
BY
ATTORNEY.

Patented Jan. 11, 1944

2,339,010

UNITED STATES PATENT OFFICE 2,339,010

COMBINED LIGHT FIXTURE AND STERILE LAMP

Milton S. Greenwald, Los Angeles, Calif.

Application June 17, 1942, Serial No. 447,351

2 Claims. (Cl. 240—78)

This invention pertains to a lighting fixture particularly adapted for use in meat packing plants, over fruit and vegetable sorting tables, in canneries and packing houses, or wherever thorough illumination is desired and in addition it is desirable that the objects being inspected, examined, sorted, packed, processed or otherwise treated are maintained in a substantially sterile or antiseptic condition.

In recent years the use of ultra-violet rays for bactericidal purposes and for the sterilization of objects as well as the atmosphere within given enclosures, has made available light sources which emit a high proportion of rays of the ultra-violet type. These lamps are generally made of quartz or special types of glass in the form of tubes, the ionization of the gases or vapors within such tubes causing the generation and emission of short wave lengths of light of a desired character, frequency or band of frequencies. It has been found that even though meat and other food products, therapeutic materials, etc. can be effectively subjected to these rays and maintained in a sterile condition, it is dangerous for humans to expose themselves to these rays for even a relatively short period of time.

The problem solved by the present invention is the provision of a lighting fixture which suitably illuminates the field of operations, thereby facilitating the work of the operators, and at the same time directs rays from the ultra-violet lamp along a predetermined path and preferably in the form of a relatively narrow curtain so that the operators are not subjected to the action of the rays from the ultra-violet lamp even though they and the objects being treated are properly illuminated from the same lighting fixture. The use of individual fixtures, one for ordinary illumination and another for the bactericidal or ultra-violet rays, has not been satisfactory. In the lighting fixture of the present invention, both the illumination and bactericidal ray sources are contained within a single fixture, the elements thereof being arranged so as to facilitate the replacement of the ultra-violet lamp without the necessity of dismantling the entire fixture. Moreover, the fixture is so arranged that it may be used simply as a source of visual illumination, the ultra-violet lamp being then cut off.

Generally stated, the present invention therefore pertains to a lighting fixture in which an ultra-violet lamp and ordinary sources of illumination are embodied, the ultra-violet rays being restrained by the sources of visual illumination so as to form a curtain of bactericidal or ultra-violet rays upon a table or line of travel of objects being treated or processed, the normal sources of illumination functioning to thoroughly illuminate such table or objects.

A further object of the invention is to provide a combined lighting fixture from which the spread of ultra-violet rays is restricted.

A still further object of the invention is to disclose and provide a lighting fixture in which the means for restricting the spread of ultra-violet rays comprise sources of visual illumination.

These and other objects and advantages of the present invention will become apparent to those skilled in the art from the following description of a preferred form of fixture embraced by the present invention. A preferred embodiment is illustrated in the appended drawing, in which:

Fig. 1 is a perspective view of the fixture.

Fig. 2 is a side elevation thereof.

Fig. 3 is a transverse section taken along the plane III—III of Fig. 2.

Fig. 4 is a perspective view of a removable collimating member employed in the device illustrated.

The lighting fixture illustrated in the appended drawing employed the so-called gaseous discharge fluorescent tubes as sources of visual illumination. These tubes are indicated at 1 and 2. The fixture itself comprises a central portion provided with upwardly and outwardly directed, longitudinally extending reflector portions 3 and 4, the outer ends of such reflector portions forming two parallel side members 5 and 6. A downwardly directed longitudinal opening is formed in the center portion, this opening being shorter than the fixture itself. Edges of the opening may be defined by the upwardly and inwardly directed lips 7 and 8 extending from the reflector portions 3 and 4. A lamp housing, generally indicated at 10, is positioned above this opening, the ends of the lamp housing extending downwardly to form partitions or ends of the opening, as indicated at 11 and 12. The housing 10 is materially shorter than the total length of the fixture or the length of the reflecting portions 3 and 4, as best seen in Fig. 2. Well known sockets for mounting an ultra-violet or bactericidal lamp are carried by these end portions 11 and 12 of the housing 10, the ultra-violet lamp being indicated at 13. The lamp 13 may be inserted and mounted in its sockets through the opening hereinbefore noted. Removably positioned in the opening is a collimating assembly shown in detail in Fig. 4, such collimating assembly including a plurality of longitudinally spaced, parallel collimating elements 14 held together in any suitable manner as, for example, by the side rails 15 and 16. Pins 17 may be carried by the end elements, such pins being received by apertures formed in the end plates 11 and 12. The entire collimating element is thus spring-fitted into the opening beneath the ultra-violet lamp 13. The housing 10 may be attached to the opening in any suitable manner, preferably by welding to the up-turned lips 7 and 8.

This center section also carries a pair of longitudinally extending sources of illumination such as the fluorescent tubes 1 and 2. The mounting brackets 20 and 21 are preferably carried by the opposing upwardly and outwardly directed reflector portions 3 and 4. At all events, the mounting brackets 20 and 21 are so positioned that the sources of illumination 1 and 2 are held in spaced relation to the reflectors 3 and 4 and below the opening and housing 10, and the ultra-violet lamp 13 positioned therein.

This central portion is then mounted within an outer housing, generally indicated at 22, this outer housing including a rectangular cover 23 provided with the sides 24 and 25, the upstanding sides 5 and 6 of the center portion slidably fitting into contact with the sides 24 and 25, suitable screws or bolts passing through the adjacent sides to hold the center portion within the housing. The housing 22 also includes the downwardly and outwardly flaring reflectors 26 and 27 which cooperate with the reflectors 3 and 4 respectively to effectively distribute light from the sources 1 and 2. The housing is also provided with suitable end plates 28.

When the lighting fixture described hereinabove is employed it will be noted that the light sources 1 and 2 act as masking means for the lamp 13. The maximum angle through which ultra-violet rays may be discharged downwardly from the fixture is delineated by the dotted lines 30 and 31. It will be noted that this relatively narrow angle is established by the light sources 1 and 2.

The ultra-violet rays will not pass through ordinary glass or the compositions within fluorescent tubes. Effective distribution of light from the sources 1 and 2 is established, however, so that the objects being inspected or treated are made clearly visible to the operators. The collimating assembly, including the collimating elements 14, prevents the ultra-violet rays from being thrown along the axis of the fixture, thereby limiting the scope of the field of action of the rays and preventing the rays from impinging upon workers or operators.

It will be evident to those skilled in the art that the ultra-violet lamp 13 may be cut off or deenergized without detracting from the utility of the lighting fixture as a source of illumination. When the ultra-violet lamp is in action, visual illumination is thrown upon the objects being treated by the ultra-violet rays from both sides of the source of such rays so that undesired shadows are prevented and much more effective inspection or processing of the goods or materials may be performed by the operators.

All changes and modifications coming within the scope of the appended claims are embraced thereby.

I claim:

1. In a lighting fixture, the combination of: a center portion including upwardly and outwardly directed longitudinal reflectors, a lamp housing between such reflectors, a downwardly directed longitudinal opening in said center portion communicating with the lamp housing, means for mounting an ultra-violet lamp in said lamp housing but above the lower edges of the opening communicating with the lamp housing, and means for mounting longitudinally extending fluorescent lamps carried by the reflectors whereby said fluorescent lamps are held adjacent the opening to act as shields for ultra-violet rays and de-limit the angle at which ultra-violet rays may be emitted from the lamp in said housing to a narrow curtain.

2. In a lighting fixture, the combination of: a center portion including upwardly and outwardly directed longitudinal reflectors, a lamp housing between said reflectors, a downwardly directed longitudinal opening in said center portion communicating with the lamp housing, means for mounting an ultra-violet lamp in said lamp housing above the lower edges of the opening communicating with the lamp housing, means for mounting longitudinally extending fluorescent lamps carried by the reflectors whereby said fluorescent lamps are held adjacent the opening to act as shields for ultra-violet rays emitted from the lamp in said housing, and an outer housing adapted to receive and hold said center portion, said outer housing including downwardly and outwardly extending reflector portions adapted to cooperate with the reflectors of the center portion and fluorescent lamps carried thereby to provide virtually shadowless lighting upon objects subjected to the ultra-violet rays.

MILTON S. GREENWALD.